United States Patent
Kowalski et al.

(10) Patent No.: US 7,519,035 B2
(45) Date of Patent: Apr. 14, 2009

(54) METHOD TO NEGOTIATE CONSUMED POWER VERSUS MEDIUM OCCUPANCY TIME IN MIMO BASED WLAN SYSTEMS USING ADMISSION CONTROL

(75) Inventors: John M. Kowalski, Camas, WA (US); Srinivas Kandala, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 814 days.

(21) Appl. No.: 11/050,487

(22) Filed: Feb. 1, 2005

(65) Prior Publication Data

US 2005/0185613 A1 Aug. 25, 2005

Related U.S. Application Data

(60) Provisional application No. 60/547,102, filed on Feb. 23, 2004.

(51) Int. Cl.
*H04Q 7/24* (2006.01)

(52) U.S. Cl. .................................. 370/338; 370/329

(58) Field of Classification Search ............. 370/277, 370/278, 282, 329, 330, 338, 339, 478, 493, 370/252, 254, 437
See application file for complete search history.

(56) References Cited

U.S. PATENT DOCUMENTS

2003/0093526 A1* 5/2003 Nandagopalan et al. ...... 709/225
2004/0146018 A1* 7/2004 Walton et al. ............... 370/329

\* cited by examiner

*Primary Examiner*—Philip J Sobutka
(74) *Attorney, Agent, or Firm*—David C. Ripma

(57) ABSTRACT

A method of selectively providing MIMO transmission/reception in a WLAN system includes using a TSPEC reservation and signaling mechanism to instantiate and tear down, dynamically, multi-channel operation in a WLAN; providing an inference algorithm to determine the minimum number of channels required to establish a TSPEC using a MIMO WLAN system; providing specific channel parameters as parameters to be negotiated in the TSPEC; providing frame exchange sequences to be used in Enhanced Distributed Coordinated Access contention based access and to be used in polled access; and providing a mechanism wherein an access point makes a decision as to whether to admit MIMO functionality on a given link, wherein a "link" is a set of communications between two specific WLAN stations.

14 Claims, 3 Drawing Sheets

METHOD TO NEGOTIATE CONSUMED POWER VERSUS MEDIUM OCCUPANCY TIME IN MIMO BASED WLAN SYSTEMS USING ADMISSION CONTROL

RELATED APPLICATION

This Application is related to and claims priority from U.S. Provisional Patent Application Ser. No. 60/547,102, filed Feb. 23, 2004, entitled Method to negotiate consumed power versus medium occupancy time in MIMO based WLAN systems using admission control.

FIELD OF THE INVENTION

This invention describes use of a multiple input, multiple output enhancement for IEEE 802.11 protocols and specifically to a MIMO enhancement which is selectively applied, thereby reducing overall power consumption.

BACKGROUND OF THE INVENTION

Wireless LAN systems are proposed that utilize Multiple Input Multiple Output (MIMO) transmission technology for high throughput extensions to the IEEE 802.11 standard by the IEEE 802.11n Task Group. MIMO techniques promise a significant throughput increase over legacy techniques, however, they consume more power for increased signal processing, and, for the same range, require transmitted power to be roughly N times that of a single channel, where N is the number of channels used to transmit a signal.

This problem may be alleviated using specific signaling mechanisms which use MIMO only when there is data that must be transmitted over multiple channels. Such signaling mechanisms, as currently exist in IEEE 802.11e, may be used to determine the number of channels that are used for a given transmission to instantiate MIMO processing. By using the Transmission Specification (TSPEC) reservation mechanism, in particular, MIMO processing may be used only when needed, thereby saving power. A thorough discussion and description of legacy IEEE 802.11 systems and MIMO may be found in IEEE 802.11e Draft 6.0, IEEE 802.11-1999 Std. 2003 Edition, and Gesbert et al., *From Theory to Practice: An Overview of MIMO Space-Time Coded Wireless Systems*, IEEE JSAC, Apr. 2003, pp. 281-302.

United States Patent Application No. 20030072283 Al of Varshney et al., published Apr. 17, 2003, for Method and system to increase QoS and range in a multicarrier system, describes a MIMO system with multiple coding layers for EDGE, etc.

United States Patent Application No. 20030072283 Al of Varshney et al., published Apr. 17, 2003, for Method and system to increase QoS and range in a multicarrier system, describes coding and multi-carrier techniques.

United States Patent Application No. 20030231715 Al of Shoemaker et al., published Dec. 18, 2003, for Methods for optimizing time variant communication channels, describes multi-channel modulation and signal processing.

United States Patent Application No. 20030185241 Al of Lu et al., published Oct. 2, 2003, for Wireless network scheduling data frames including physical layer configuration, describes a method of implementing communication frames in a wireless network having a plurality of wireless devices, some of which are capable of different physical layer configurations than other of the devices, which include (a) forming a polling frame including at least one bit in which physical layer configuration information is encoded, wherein the configuration information is capable of specifying whether a single input single output (SISO) antenna configuration is to be used or a multiple input multiple output (MIMO) antenna configuration is to be used; (b) transmitting the polling frame to a receiving device for decoding by the receiving device; and (c) configuring a physical layer of the receiving device in accordance with the physical layer configuration information contained in the polling frame; wherein the polling frame also causes the receiving device to determine whether it has information to return.

United States Patent Application No. 20030169769 Al of Ho et al., published Sep. 11, 2003, for MAC extensions for smart antenna support, describes an apparatus and method to implement aggregation frames and allocation frames.

WO 03/003672, of Dohler et al., published Jan. 9, 2003, for Improvements in or relating to electronic data communication system, describes a variant of a CDMA system.

SUMMARY OF THE INVENTION

A method of selectively providing MIMO transmission/reception in a WLAN system includes using a TSPEC reservation and signaling mechanism to instantiate and tear down, dynamically, multi-channel operation in a WLAN; providing an inference algorithm to determine the minimum number of channels required to establish a TSPEC using a MIMO WLAN system; providing specific channel parameters as parameters to be negotiated in the TSPEC; providing frame exchange sequences to be used in Enhanced Distributed Coordinated Access contention based access and to be used in polled access; and providing a mechanism wherein an access point makes a decision as to whether to admit MIMO functionality on a given link, wherein a "link" is a set of communications between two specific WLAN stations.

It is an object of the invention to provide MIMO signal processing in certain IEEE 802.11 protocols.

Another object of the invention is to provide MIMO in the TSPEC of IEEE 802.11e and IEEE 802.11n, either implicitly or explicitly, A further object of the method of the invention is to provide information as to how many channels it is desired to use for MIMO signal processing.

Another object of the method of the invention is to provide explicit notification as the number of channels in which to transmit and receive may then be explicitly negotiated by the IEEE 802.11 protocol entities negotiating the TSPEC.

Still another object of the invention is to save power and minimize air time in IEEE 802.11 protocols.

Another object of the invention is to provide MIMO signal process which builds on existing IEEE 802.11 protocols, thereby providing simpler hardware solutions, and reducing time to market for development and certification.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENTS

Figure 1:
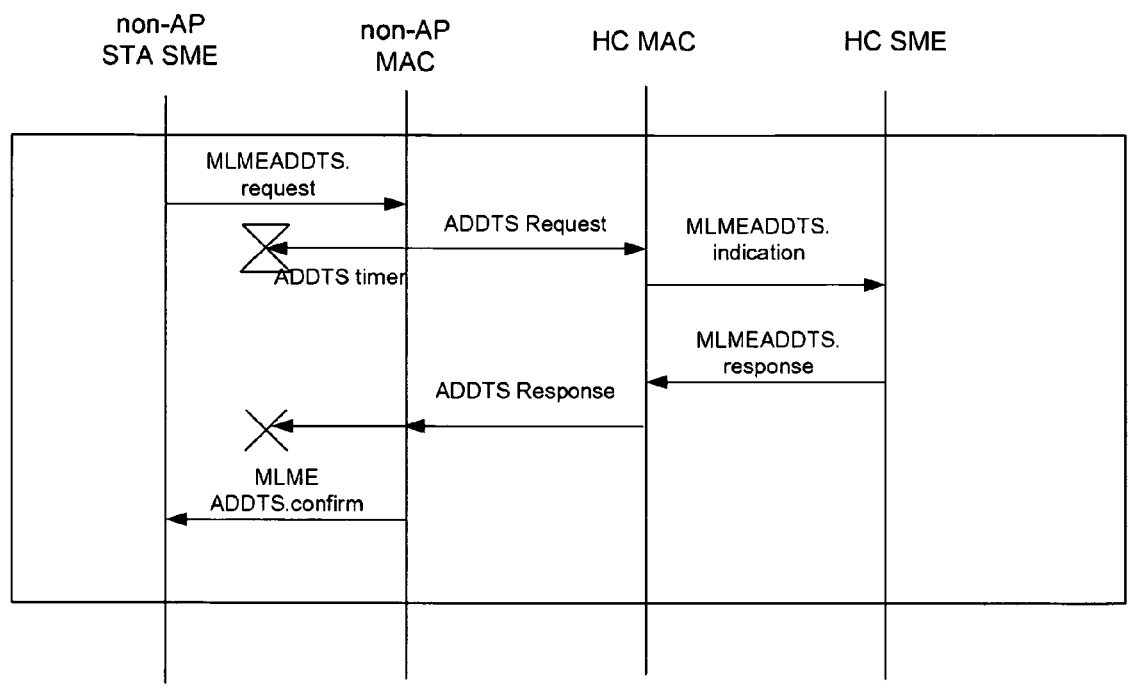
FIG. 1 depicts a TSPEC negotiation stream of IEEE 802.11e.

This invention embeds in the Transmission Specification (TSPEC) used in IEEE 802.11e and as will be used by IEEE 802.11n, either implicitly or explicitly, information as to how many channels it is desired to use for Multiple Input Multiple Output (MIMO) signal processing. Explicit notification is the preferred embodiment, as the number of channels in which to transmit and receive may then be explicitly negotiated by IEEE 802.11 entities negotiating the TSPEC, with the objective of saving power consistent with minimizing time on the air.

Another benefit of the method of the invention is that it builds on existing IEEE 802.11 entities to accomplish power savings and channel selection, and thereby makes for simpler hardware solutions, and reduces time to market for development and certification.

To summarize, the unique aspects of the invention include (1) the use of the TSPEC reservation and signaling mechanism to instantiate and tear down, dynamically, multi-channel operation in an IEEE 802.11e/n WLAN; (2) an inference algorithm to determine the minimum number of channels required to establish a TSPEC using a MIMO system; (3) the inclusion of specific channel parameters, e.g., the number of transmit and receive channels required, as parameters to be negotiated in an IEEE 802.11e-like TSPEC; (5) the use of the frame exchange sequences to be used in Enhanced Distributed Coordinated Access (EDCA contention based access), as well as polled access; (5) a method by which the Access Point (AP) makes a decision as to whether to admit MIMO functionality on a given link, wherein a "link" is a set of communications between two specific IEEE 802.11 radios; and (6) an alternative embodiment wherein a management frame exchange sequence separate from the TSPEC negotiation frame exchange sequence, but modeled after its logic is used to allow for non-QoS Data to be sent, as well as to clarify the protocol's functionality.

MIMO systems, as stated earlier herein, are multiple-input multiple output systems that in general, use "N" transmitting "channels" and "M" receiving "channels" to realize up to an N×M increase in throughput over that available in a single input, single output (SISO) system. The exact form of the MIMO systems may vary according to the specific parameters established by the method of the invention, however, the amount of signal processing required over a SISO system is significantly more than N×M MIPS, because additional signal processing is done for interference cancellation, optimal filtering, etc.

Thus, it is in the best interests of the WLAN architect to use MIMO "sparingly," that is, only for those applications which need to use MIMO, or when congestion on the medium demands use of MIMO. As is well known by those of ordinary skill in the art, IEEE 802.11 systems are Carrier Sense Multiple Access with Collision Avoidance, thus all IEEE 802.11 terminals share the same medium time, and use channel sensing and collision back off as "medium etiquette."

TABLE 1

| Transmission Specification in IEEE 802.11e (D 6.0) | | | | | |
|---|---|---|---|---|---|
| Element ID (13) | Length (55) | TS Info | Nominal MSDU Size | Maximum MSDU Size | Minimum Service Interval |
| Maximum Service Interval | Inactivity Interval | Suspension Interval | Service Start Time | Minimum Data Rate | Mean Data Rate |
| Peak Data Rate | Maximum Burst Size | Delay Bound | Minimum PHY rate | Surplus Bandwidth Allowance | Medium Time |

The details of the fields in Table 1 are fully described in IEEE 802.11e, Draft 6.0. The TSPEC describes a QoS flow that is to be set up between a Station (STA) and an Access Point (AP) or between two stations, to achieve given throughputs, latency, etc., by having the AP schedule a polling sequence and granting medium time to meet this Transmission Specification.

First Embodiment

In a like manner two four bit fields may be appended to the convention TSPEC:

TABLE 2

| MIMO Channel Field | |
|---|---|
| Number of Tx Channels | Number of Rx Channels |

These two field indicate the number of channels that the requestor is specifying for transmission, i.e., the Number of Tx Channels field and reception, i.e., the Number of Rx Channels field, on the medium. These two four bit fields are referred to collectively herein as the "MIMO Channel" field. The TSPEC negotiation features present in IEEE 802.11e are used to negotiate the actual number of channels used, which, in general represents a tradeoff of power to be saved versus medium access time.

This embodiment is preferred over the next described embodiment, because it allows for explicit negotiation within an existing framework.

This TSPEC object is used as an element in the Add Traffic Stream (ADDTS) QoS management action frame, with an action set to "request," as in §7.4.2.1 of IEEE 802.11e, which is used by a client device to negotiate the instantiation of a QoS data stream. The format of the ADDTS frame body, minus header, CRC information, etc., is presented in Table 3. The "Order" column identifies the order of the "Information Elements" as located in the Frame Body. The specific Information Elements are described in the draft of IEEE 802.11e.

TABLE 3

ADDTS Frame Request Body

| Order | Information Element |
|---|---|
| 1 | Category |
| 2 | Action |
| 3 | Dialog Token |
| 4 | TSPEC |
| 5-n | TCLAS (optional) |
| n + 1 | TCLAS Processing (optional) |

The "Category" element here signals the type of QoS Management Action for this frame, which indicates an ADDTS request frame. As is known to one of ordinary skill in the art, embedding the MIMO information within a TSPEC, i.e., element 4 of the request frame, the identical frame body structures and frame exchange sequences as used in IEEE 802.11e may be used to negotiate channel resources for a MIMO system.

The AP responds with an ADDTS management frame with an action set to "response." The format of that frame is the same as the ADDTS request, with "Category" set to "response." The response frame is similar to the request frame, with the addition of the fields "Status Code," "TS Delay" and "Schedule," as shown in Table 4. The Status Code field, e.g., IEEE 802.11e, §7.3.1.9 in particular, contains the form of the response from the AP in response to the request: the request is either accepted, declined without additional information, declined with a suggestion for an acceptable TSPEC, or declined but information is given as to when a QoS stream might be able to be created, using the TS Delay field. Furthermore, the Schedule element determines witch parameters in time as to the exact details of the polling sequence. These elements and action codes are identical to action codes that may be created to instantiate different MIMO transmit/receive channel configurations with sufficient flexibility and precision. Moreover, by doing this with the same paradigm as used in IEEE 802.11e, albeit for a different purpose, the MAC designer implements both a QoS functionality and MIMO resource negotiation the same way, which yields a simpler design.

TABLE 4

ADDTS Frame Response Body

| Order | Information Element |
|---|---|
| 1 | Category |
| 2 | Action |
| 3 | Dialog Token |
| 4 | Status Code |
| 5 | TS Delay |
| 6 | TSPEC |
| 7-n | TCLAS (optional) |
| n + 1 | TCLAS Processing (optional) |
| n + 2 | Schedule |

The stream negotiation procedure for IEEE 802.11e is depicted in FIG. 68.2 of IEEE 802.11e, and is repeated herein as FIG. 1. The STA's Station Management Entity (SME), as the requester, is the entity that initiates an MLMEADDTS.request primitive, containing the information required to set up a traffic stream, which triggers an ADDTS Request message sent from the non-AP station's Media Access Control (MAC) to the AP's Hybrid Coordinator MAC (HC MAC) which in turn triggers an MLMEADDTS.indication primitive from the AP'S HC MAC to the AP's Station Management Entity (AP SME), which in turn triggers an MLMEADDTS.response primitive. That primitive contains the information regarding the decision regarding admission of the stream, schedule, if admitted, and possible alternate TSPECs, etc. The MLMEADDTS.response primitive in turn is sent as an ADDTS Response frame to the requesting station. That primitive contains the information regarding the decision regarding admission of the stream, schedule, if admitted, and possible alternate TSPECs, etc. The MLMEADDTS.response primitive in turn is sent as an ADDTS Response frame to the requesting station. For brevity, here, we will not review the Delete Traffic Stream (DELTS) frame exchange which is the frame exchange sequence that tears down a traffic stream, and is fully described in IEEE 802.11e, D6, §11.4.7.

Second Embodiment

An alternative embodiment is for the TSPEC Minimum PHY rate to convey this information implicitly, and use the minimum number of channels to cover the Minimum PHY rate, however, as the minimum PHY rate is related to an underlying Physical Layer, within a single channel, it provides less flexibility than does the previous embodiment, may be harder to achieve interoperability because the Minimum PHY rate parameter is now "overloaded," and allows fewer "degrees of freedom" in the negotiation (the Minimum PHY rate in a channel could be increased for SISO operation or decreased for MIMO operation, and depends on the application which would have better performance or occupy less medium time.)

Third Embodiment

Yet another embodiment is to use a separate action management frame exchange sequence that mirrors the TSPEC negotiation in IEEE 802.11e. This provides more flexibility and allows the TSPEC negotiation mechanism to be decoupled from the resource negotiation mechanism. Moreover, it provides for a simple extension to AP-to-AP negotiation of MIMO parameters, useful for Wireless Distribution Systems.

Thus the relevant Action Management Frame Types involved are:

Add MIMO Request Frame, which requests a number of channels for transmit and receive;

Add MIMO Response Frame, which is the response the AP makes in response to the request frame, which allows the AP to manage medium occupancy time on the channel; and Delete MIMO Request Frame, which allows a STA to revert back to SISO, i.e., one channel for transmit/receive, operation.

These frames include appropriate identifying fields within the syntax of IEEE 802.11 to uniquely identify these frames; those formats are not the relevant to the claims of this patent, and only the details of the frame bodies are discussed here.

The Add MIMO Request Frame has the following elements in its frame body:

TABLE 5

Add MIMO Request Frame Body

| Order | Information Element |
|---|---|
| 1 | Category |
| 2 | Dialog Token |
| 3 | MIMO Channel Element |

The "Category" field is either Request, Response, or Delete, by uniquely mapping those actions into three of the reserved fields currently allocated in the QoS Action Field defined in §7.4.2 of IEEE 802.11e. The "Dialog Token" field is used for matching action responses with action requests when there are multiple concurrent action requests; this may be the case as their may be, for example, concurrent QoS actions pending as well as the actions described herein. The "MIMO Channel Element" field, in this case, is the MIMO Channel Field defined above, with the an appropriate element ID appended, following the syntax of IEEE 802.11.

Similarly, the Add MIMO Response Frame Body is depicted in Table 6:

TABLE 6

Add MIMO Response Frame Body

| Order | Information Element |
|---|---|
| 1 | Action |
| 2 | Dialog Token |
| 3 | Status Code |
| 4 | MIMO Delay |
| 5 | MIMO Channel Element |
| 6 | MIMO Schedule (optional) |

The "Action" and "Dialog Token" fields are as described above. The "Status Code" field uses existing, or new, status codes to indicate the following actions:

(1) "Request Accepted" (already used; this field, with the Dialog Token, allows overloading of this field, so no new field is needed);

(2) "Request Denied" (already used; this field, with the Dialog Token, allows overloading of this field, so no new field is needed);

(3) The MIMO Channel parameters requested cannot be granted. However, a suggested MIMO channel request is provided so that the initiating STA may attempt to re-negotiate; and (4) Request Denied, however, the request may be granted in response to a new request, after time indicated in the MIMO Delay element (which follows the same format as the TS Delay Element).

Figure 2:
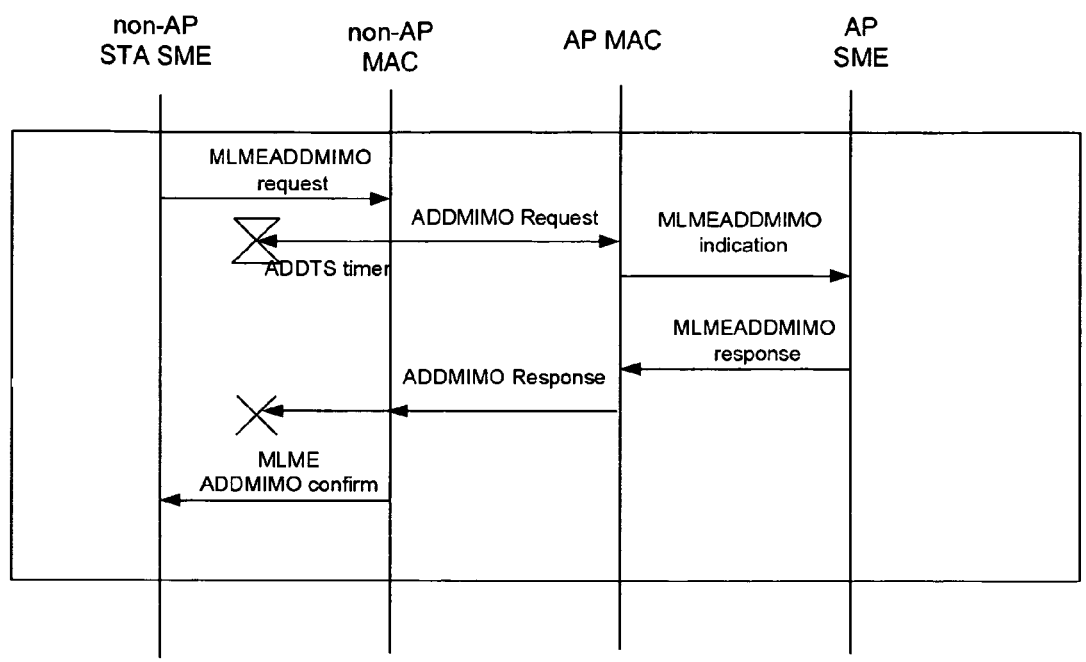
FIG. 2 depicts a MIMO request frame sequence of the method of the invention.
Figure 3:
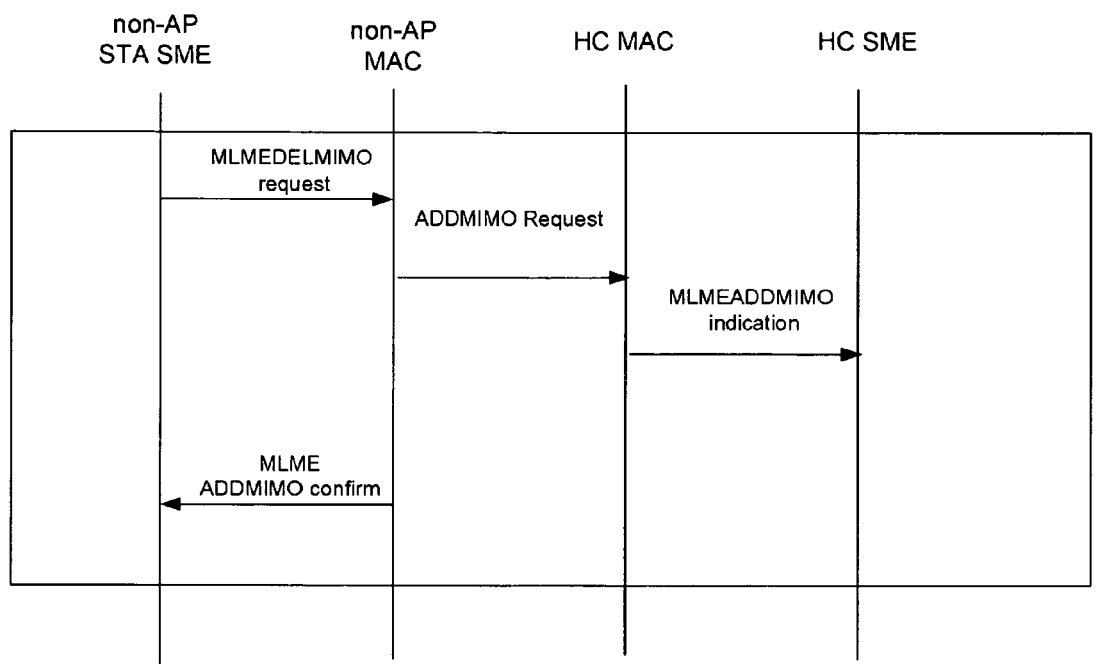
FIG. 3 depicts a MIMO resource deletion frame sequence exchange sequence of the method of the invention.

The frame exchange sequences of the method of the invention are depicted in FIG. 2, to request MIMO resources, which essentially follow the logic described earlier for traffic stream admission. The STA's Station Management Entity, as the requester, is the entity that initiates a MLMEADDMIMO.request primitive, containing the information regarding the STA, and the requested receive and transmit resources, which triggers an ADDMIMO Request message sent from the non-AP station's MAC to the AP's HC MAC, which in turn triggers an MLMEADDMIMO.indication primitive from the AP'S MAC to the AP's Station Management Entity (AP SME), which in turn triggers an MLMEMIMO.response primitive. That primitive contains the information regarding the decision regarding admission of the transmission of receive/transmission for the number of channels, a schedule, if admitted, and possible alternate resource allocations, etc. The MLMEADDMIMO.response primitive in turn is sent as an ADDMIMOResponse frame to the requesting station. The Delete MIMO Request Frame is identical to the Add MIMO Request Frame, but with the Category set to "Delete," as depicted in FIG. 3.

The AP generally bases its decisions to use MIMO resources on a number of criteria, including, but not limited to: the number of stations associated on the network, the overall time usage that any one particular station may be using compared to its throughput (higher throughput stations would be readily granted MIMO resources), whether or not power save modes of 80211 are used, etc. To remove MIMO resources, a frame exchange sequence patterned after the deletion of traffic streams, as described in IEEE 802.11e §11.4.7, may be used. This embodiment is preferred, over the other two embodiments, as it allows for the negotiation of MIMO resources independently of QoS functions, and in particular, may be used for contention based channel access. As in the deletion of traffic streams, no response is necessary, because no decision is really needed from the AP to remove resources.

Finally, it should be noted that this last embodiment may be extended to AP-to-AP communication, by replacing "non-AP" with "AP" in the above signal flow diagrams.

Thus, a method to negotiate consumed power versus medium occupancy time in MIMO based WLAN systems using admission control has been disclosed. It will be appreciated that further variations and modifications thereof may be made within the scope of the invention as defined in the appended claims.

We claim:

1. A method of selectively providing MIMO transmission/reception in a WLAN system, comprising:

using a TSPEC reservation and signaling mechanism to instantiate and tear down, dynamically, multi-channel operation in a WLAN;

providing an inference algorithm to determine the minimum number of channels required to establish a TSPEC using a MIMO WLAN system;

providing specific channel parameters as parameters to be negotiated in the TSPEC;

providing frame exchange sequences to be used in Enhanced Distributed Coordinated Access contention based access and to be used in polled access;

providing a mechanism wherein an access point makes a decision as to whether to admit MIMO functionality on a given link, wherein a "link"is a set of communications between two specific WLAN stations; and using a frame exchange sequence to request MIMO resources, wherein a station's station management entity, as the requestor, is the entity that initiates a MLMEADDMIMO.request primitive, containing the information regarding the station, and the requested receive and transmit resources, triggers an ADDMIMO Request message sent from the non-AP station's MAC to the AP's HC MAC, which triggers an MLMEADDMIMO.indication primitive from the AP'S MAC to the AP's Station Management Entity, which triggers an MLMEMIMO.response primitive, wherein the MLMEMIMO.response primitive contains the information regarding the decision regarding admission of the transmission of receive/transmission for the number of channels, a schedule, if admitted, and alternate resource allocations, and wherein the MLMEADDMIMO.response primitive in turn is sent as an ADDMIMOResponse frame to the requesting station.

2. A method of selectively providing MIMO transmission/reception in a WLAN system, comprising:

using a TSPEC reservation and signaling mechanism to instantiate and tear down, dynamically, multi-channel operation in a WLAN;

providing an inference algorithm to determine the minimum number of channels required to establish a TSPEC using a MIMO WLAN system;

providing specific channel parameters as parameters to be negotiated in the TSPEC;

providing frame exchange sequences to be used in Enhanced Distributed Coordinated Access contention based access and to be used in polled access;

providing a mechanism wherein an access point makes a decision as to whether to admit MIMO functionality on a given link, wherein a "link" is a set of communications between two specific WLAN stations; and providing action management frame types, including an Add MIMO Request Frame, which requests a number of channels for transmit and receive; an Add MIMO Response Frame, which is the response the AP makes in response to the request frame, which allows the AP to manage medium occupancy time on the channel; and a Delete MIMO Request Frame, which allows a STA to revert back to one channel for transmit/receive operations.

3. The method of claim 2 wherein said Add MIMO Request Frame has Information Elements which include: Category, Dialog Token, and MIMO Channel Element, where "Category" is set to "Add."

4. The method of claim 2 wherein said Add MIMO Response Frame has Information Elements which include: Action, Dialog Token, Status Code, MIMO Delay, MIMO Channel Element, and MIMO Schedule (optional).

5. The method of claim 2 wherein said Delete MIMO Request Frame has Information Elements which include: Category, Dialog Token, and MIMO Channel Element, wherein "Category" is set to "Delete".

6. A method of selectively providing MIMO transmission/reception in a WLAN system, comprising:

using a TSPEC reservation and signaling mechanism to instantiate and tear down, dynamically, multi-channel operation in a WLAN;

providing an inference algorithm to determine the minimum number of channels required to establish a TSPEC using a MIMO WLAN system;

providing specific channel parameters as parameters to be negotiated in the TSPEC;

providing frame exchange sequences to be used in Enhanced Distributed Coordinated Access contention based access and to be used in polled access, wherein the frame exchange sequence requests MIMO resources, wherein a stations station management entity, as the requestor, is the entity that initiates a MLMEADDMIMO.request primitive, containing the information regarding the station, and the requested receive and transmit resources, triggers an ADDMIMO Request message sent from the non-AP station's MAC to the AP's HC MAC, which triggers an MLMEADDMIMO.indication primitive from the AP's MAC to the AP's Station Management Entity, which triggers an MLMEMIMO.response primitive, wherein the MLMEMIMO.response primitive contains the information regarding the decision regarding admission of the transmission of receive/transmission for the number of channels, a schedule, if admitted, and alternate resource allocations, and wherein the MLMEADDMIMO.response primitive in turn is sent as an ADDMIMOResponse frame to the requesting station; and providing a mechanism wherein an access point makes a decision as to whether to admit MIMO functionality on a given link, wherein a "link" is a set of communications between two specific WLAN stations.

7. The method of claim 6 wherein said providing specific channel parameters includes defining the number of required transmit and receive channels.

8. The method of claim 6 wherein said providing an inference algorithm includes establishing a MLMEMIMO.response primitive which contains the information to determine admission of the transmission of receive/transmission for the number of channels, a schedule, if admitted, and alternate resource allocations.

9. The method of claim 6 which includes adding two four-bit fields to the TSPEC to define the number of transmit channels and the number of receive channels.

10. The method of claim 6 which includes action management frame types, including an Add MIMO Request Frame, which requests a number of channels for transmit and receive; an Add MIMO Response Frame, which is the response the AP makes in response to the request frame, which allows the AP to manage medium occupancy time on the channel; and a Delete MIMO Request Frame, which allows a STA to revert back to one channel for transmit/receive operations.

11. The method of claim 10 wherein said Add MIMO Request Frame has Information Elements which include: Category, Dialog Token, and MIMO Channel Element, where "Category" is set to "Add;" and wherein said Delete MIMO Request Frame has Information Elements which include: Category, Dialog Token, and MIMO Channel Element, wherein "Category" is set to "Delete".

12. The method of claim 10 wherein said Add MIMO Response Frame has Information Elements which include: Action, Dialog Token, Status Code, MIMO Delay, MIMO Channel Element, and MIMO Schedule (optional).

13. The method of claim 6 wherein a TSPEC Minimum PHY rate is used implicitly to convey traffic information and use the minimum number of channels to cover the Minimum PHY rate.

14. The method of claim 6 wherein a management frame exchange sequence separate from the TSPEC negotiation frame exchange sequence is provided to allow for non-QoS Data to be sent.

* * * * *